(12) United States Patent
Chan et al.

(10) Patent No.: US 7,433,870 B2
(45) Date of Patent: Oct. 7, 2008

(54) METHOD AND APPARATUS FOR SECURE PROCESSING OF XML-BASED DOCUMENTS

(75) Inventors: Chee-Yong Chan, Singapore (SG); Wenfei Fan, Somerset, NJ (US); Minos N. Garofalakis, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 415 days.

(21) Appl. No.: 11/022,894

(22) Filed: Dec. 27, 2004

(65) Prior Publication Data

US 2006/0143557 A1 Jun. 29, 2006

(51) Int. Cl.
*G06F 17/30* (2006.01)
*G06F 7/00* (2006.01)
(52) U.S. Cl. .................................. 707/9; 707/104.1
(58) Field of Classification Search ............... 707/9, 707/104.1
See application file for complete search history.

(56) References Cited

U.S. PATENT DOCUMENTS

| 6,134,549 | A  | * | 10/2000 | Regnier et al. ............ 707/9 |
| 2003/0101169 | A1 | * | 5/2003 | Bhatt et al. ............... 707/3 |
| 2004/0015783 | A1 | * | 1/2004 | Lennon et al. ........... 715/523 |
| 2004/0199905 | A1 | * | 10/2004 | Fagin et al. ............. 717/136 |
| 2005/0203933 | A1 | * | 9/2005 | Chaudhuri et al. ........ 707/101 |

OTHER PUBLICATIONS

Elisa Bertino, Silvana Castano, Elena Ferrari and Marco Mesiti, "Specifying and enforcing access control policies for XML document sources", Nov. 2000, Springer Netherlands, World Wide Web vol. 3, No. 3, pp. 139-151.*

Sun-Moon Jo; Young-Kook Kim; Hoon-Joon Kouh; Weon-Hee Yoo, "Access control model for secure XML documents," Computer and Information Science, 2005. Fourth Annual ACIS International Conference on , vol., No., pp. 352-357, 2005.*

Fundulaki, I. and Marx, M. 2004. Specifying access control policies for XML documents with XPath. In Proceedings of the Ninth ACM Symposium on Access Control Models and Technologies (Yorktown Heights, New York, USA, Jun. 2-4, 2004). SACMAT '04 . ACM, New York, NY, 61-69.*

Kuper, G., Massacci, F., and Rassadko, N. 2005. Generalized XML security views. In Proceedings of the Tenth ACM Symposium on Access Control Models and Technologies (Stockholm, Sweden, Jun. 1-3, 2005). SACMAT '05. ACM, New York, NY, 77-84.*

(Continued)

*Primary Examiner*—Kuen Lu
*Assistant Examiner*—Patrick E Sweeney

(57) ABSTRACT

Method for providing controlled access to an XML document includes defining at least one access control policy for a user of the XML document, deriving a security view of the XML document for the user based upon said access control policy and schema level processing of the XML document and translating a user query based on the security view of the XML document to an equivalent query based on the XML document. An apparatus for same includes means for defining an access control policy for a user of the XML document and means for deriving a security view of the XML document for the user based on said access control policy and schema level processing of the XML document. Also included are means for translating a user query based on the security view of the XML document to an equivalent query based on the XML document.

13 Claims, 15 Drawing Sheets

OTHER PUBLICATIONS

Fan, W., Chan, C., and Garofalakis, M. 2004. Secure XML querying with security views. In Proceedings of the 2004 ACM SIGMOD international Conference on Management of Data (Paris, France, Jun. 13-18, 2004). SIGMOD '04. ACM, New York, NY, 587-598.*

G. Miklau, D. Suciu, "Controlling Access to Published Data Using Cryptography", Proceedings of the 29th VLDB Conference, Berlin, Germany, Sep. 9, 2003.

E. Bertino, E. Ferrari, "Secure and Selective Dissemination of XML Documents", ACM Transactions on Information and System Security, vol. 5, No. 3, Aug. 2002, pp. 290-331.

S. Cho, et al., "Optimizing the Secure Evaluation of Twig Queries", Proceedings of the 28th VLDB Conference, Hong Kong, China, Aug. 20, 2002.

M. Kudo, S. Hada, "XML Document Security Based on Provisional Authorization", CCS '00, Athens, Greece, pp. 87-96.

* cited by examiner

Procedure Proc_Acc($S, A$)
Input: specification $S = (D, \text{ann}())$ and an accessible type $A$ in $D$.
Output: security view $V = (D_v, \sigma)$ for $A$ and its descendants in $D$.

1. if visited[$A$, acc] then return else visited[$A$, acc] := true;
2. case the $A$-production $A \to \alpha$ in the document DTD $D$ of
3.   (1) $A \to B_1, \ldots, B_n$:
4.     $P_v(A) := A \to B_1, \ldots, B_n$; /*production in the view DTD $D_v$ */
5.     for $i$ from 1 to $n$ do
6.       if ann$(A, B_i) = $ Y
7.       then $\sigma(A, B_i) := B_i$; Proc_Acc($S, B_i$);
8.       else if ann$(A, B_i) = [q]$
9.       then $\sigma(A, B_i) = B[q]$; Proc_Acc($S, B_i$);
10.      else Proc_InAcc($S, B_i$);
11.         if reg$(B_i) = \emptyset$ then remove $B_i$ from $P_v(A)$;
12.         if reg$(B_i) = C_1, \ldots, C_k$
13.         then replace $B_i$ with reg$(B_i)$ in $P_v(A)$;
14.           for $j$ from 1 to $k$ do
15.             $\sigma(A, C_j) := B_i/\text{path}[B_i, C_j]$;
16.         else replace $B_i$ with a distinct new label $X$ in $P_v(A)$;
17.           add production $X \to $ reg$(B_i)$ to the view DTD $D_v$;
18.           $\sigma(A, X) := B_i$;
19.           for $j$ from 1 to $k$ do
20.             $\sigma(X, C_j) := \text{path}[B_i, C_j]$;
21. (2) $A \to B_1 + \ldots + B_n$:
22.   /* similar to (1), except that for an inaccessible $B_i$, if reg$(B_i)$
23.   is $C_1 + \ldots + C_k$, then replace $B_i$ with reg$(B_i)$ in $P_v(A)$ */
24. (3) $A \to B^*$:
25.   /* similar to (1), except that for an inaccessible $B_i$, if reg$(B_i)$
26.   is $C$ or $C^*$, then replace $B_i$ with reg$(B_i)$ in $P_v(A)$ */
27. (4) $A \to $ str:
28.   /* similar to (1), except that if ann$(A, \text{str}) = $ N, then
29.   $P_v(A) := A \to \epsilon$; */
30. return;

Procedure Proc_InAcc($S, A$)
Input: specification $S = (D, \text{ann}())$ and an inaccessible type $A$ in $D$.
Output: regular expression reg$(A)$ and path$[A, C]$ for each $C$ in reg$(A)$.

1. if visited[$A$, inacc] then return else visited[$A$, inacc] := true;
2. case the $A$-production $A \to \alpha$ in the document DTD $D$ of
3.   (1) $A \to B_1, \ldots, B_n$:
4.     reg$(A) := B_1, \ldots, B_n$; /* analogous to $A$-production in $D_v$ */
5.     for $i$ from 1 to $n$ do
6.       if ann$(A, B_i) = $ Y
7.       then path$[A, B_i] := B_i$; Proc_Acc($S, B_i$);
8.       else if ann$(A, B_i) = [q]$
9.       then path$[A, B_i] = B[q]$; Proc_Acc($S, B_i$);
10.      else Proc_InAcc($S, B_i$);
11.         if reg$(B_i) = \emptyset$ then remove $B_i$ from reg$(A)$;
12.         if reg$(B_i) = C_1, \ldots, C_k$
13.         then replace $B_i$ with reg$(B_i)$ in reg$(A)$;
14.           for $j$ from 1 to $k$ do
15.             path$[A, C_j] := B_i/\text{path}[B_i, C_j]$;
16.         else replace $B_i$ with a distinct new label $X$ in reg$(A)$;
17.           add production $X \to $ reg$(B_i)$ to the view DTD $D_v$;
18.           $\sigma(A, X) := B_i$;
19.           for $j$ from 1 to $k$ do
20.             $\sigma(X, C_j) := \text{path}[B_i, C_j]$;
/* similar for productions of other forms */

FIG. 5

Algorithm rewrite

*Input:* a security view $V : S \to D_v$, a query $p$ in $\mathcal{C}$ over view DTD $D_v$.
*Output:* an equivalent $\mathcal{C}$ query $p_t$ over the document DTD $D$ of $S$.

1. compute the ascending list $Q$ of sub-queries of $p$;
2. compute the list $N$ of all the nodes in $D_v$;
3. for each $p'$ in $Q$ do
4.    for each $A$ in $N$ do
5.       $\text{rw}(p', A) := \emptyset$; $\text{reach}(p', A) := \emptyset$;
6. for each $p'$ in the order of $Q$ do
7.    for each $A$ in $N$ do
8.       case $p'$ of
9.         (1) $\epsilon$: $\text{rw}(p', A) := \epsilon$; $\text{reach}(p', A) := \{A\}$;
10.        (2) $l$: if $l$ is a child type of $A$
11.           then $\text{rw}(p', A) := \sigma(A, l)$; $\text{reach}(p', A) := \{l\}$;
           /* XPath annotation $\sigma(A, l)$ is given in $V$ */
12.           else $\text{rw}(p', A) := \emptyset$; $\text{reach}(p', A) := \emptyset$;
13.        (3) $*$: for each child type $v$ of $A$ in $D_v$ do
14.           $\text{rw}(p', A) := \text{rw}(p', A) \cup \sigma(A, v)$;
15.           $\text{reach}(p', A) := \text{reach}(p', A) \cup \{v\}$;
16.        (4) $p_1/p_2$: if $\text{rw}(p_1, A) = \emptyset$
17.           then $\text{rw}(p', A) := \emptyset$; $\text{reach}(p', A) := \emptyset$;
18.           else $qq := \emptyset$;
19.              for each $v$ in $\text{reach}(p_1, A)$ do
20.                 $qq := qq \cup \text{rw}(p_2, v)$;
21.                 $\text{reach}(p', A) := \text{reach}(p', A) \cup \text{reach}(p_2, v)$;
22.              if $qq \neq \emptyset$
23.                 then $\text{rw}(p', A) := \text{rw}(p_1, A)/qq$;
24.                 else $\text{reach}(p', A) := \emptyset$; $\text{rw}(p', A) := \emptyset$;
25.        (5) $//p_1$: /* $\text{reach}(//, A)$, $\text{recrw}(A, B)$ are precomputed */
26.           for each $B$ in $\text{reach}(//, A)$ do
27.             if $\text{rw}(p_1, B) \neq \emptyset$
28.               then $\text{rw}(p', A) := \text{rw}(p', A) \cup \text{recrw}(A, B)/\text{rw}(p_1, B)$;
29.               $\text{reach}(p', A) := \text{reach}(p', A) \cup \text{reach}(B, p_1)$;
30.        (6) $p_1 \cup p_2$: $\text{rw}(p', A) := \text{rw}(p_1, A) \cup \text{rw}(p_2, A)$;
31.            $\text{reach}(p', A) := \text{reach}(p_1, A) \cup \text{reach}(p_2, A)$;
32.        (7) $\epsilon[q]$: $\text{rw}(p', A) := \epsilon[\text{rw}(q, A)]$; $\text{reach}(p', A) := \{A\}$;
33.        (8) $[p_1]$: $\text{rw}(p', A) := [\text{rw}(p_1, A)]$;
34.        (9) $[p_1 = c]$: $\text{rw}(p', A) := [\text{rw}([p_1]) = c]$;
35.        (10) $[p_1 \wedge p_2]$: $\text{rw}(p', A) := [\text{rw}([p_1], A) \wedge \text{rw}([p_2], A)]$;
36.        (11) $[p_1 \vee p_2]$: $\text{rw}(p', A) := [\text{rw}([p_1], A) \vee \text{rw}([p_2], A)]$;
37.        (12) $[\neg p_1]$: $\text{rw}(p', A) := [\neg \text{rw}([p_1], A)]$;
38. return $\text{rw}(p, r)$; /* $r$ is the root of $D_v$ */ procedure recProc($A$)   /* static precomputation for $//$ */
*Input:* a node $A$ in $D_v$.
*Output:* $\text{reach}(//, A)$, and for each $B$ in $\text{reach}(//, A)$, $\text{recrw}(A, B)$.

1. for each $B$ in $N$ do
2.    $\text{recrw}(A, B) := \emptyset$; $\text{visited}(B) := \text{false}$;
3. traverse($A$);
4. sort $\text{reach}(//, A)$ such that $x$ precedes $y$ if '$Z_x$' is in $\text{recrw}(A, y)$
5. for each $y$ in the topological list do
6.    substitute each $\text{recrw}(A, x)$ for '$Z_x$', for each $x$
7. return ($\text{reach}(//, A)$, recrw);

procedure traverse($x$);   /* invoked by procedure recProc */
1. for each child type $y$ of $x$ do
2.    $\text{recrw}(A, y) := \text{recrw}(A, y) \cup \text{'}Z_x\text{'}/\sigma(x, y)$;
      /* $\sigma(x, y)$ is the query associated with $y$ in the $x$ production */
3.    if not visited($y$)
4.    then visited($y$) := true; $\text{reach}(//, A) := \text{reach}(//, A) \cup \{y\}$;
5.       traverse($y$);
6. return;

FIG. 6

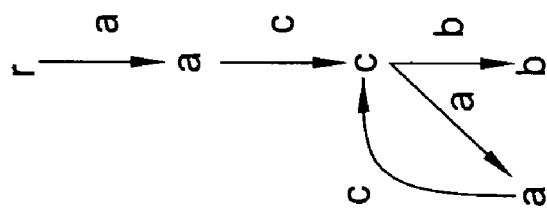
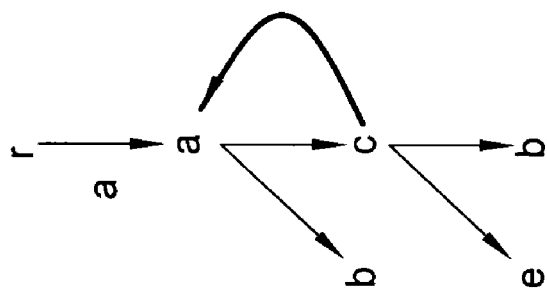
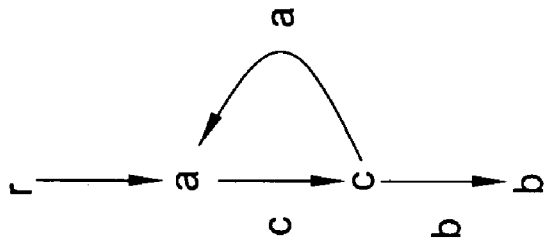
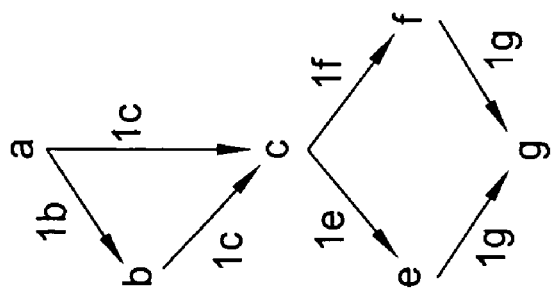
FIG. 7

800

```
Algorithm optimize (D, A, p)
Input: an XPath query p in C⁻, a DTD D and a node A in D.
Output: an optimized C⁻ query over D, equivalent to p at A elements.
1.  opt(p, A) := ∅;
2.  case p of
3.  (1) ε:  opt(p, A) := ε;  reach(p, A) := {A};
4.  (2) l:  if A has an l child v
5.          then opt(p, A) := l;  reach(p, A) := {v};
6.          else opt(p, A) := ∅;  reach(p, A) := ∅;
7.  (3) *:  for each child B of A in D do
8.              opt(p, A) := opt(p, A) ∪ B;
9.              reach(p, A) := reach(p, A) ∪ {B};
10. (4) p₁/p₂:
11.     if opt(p₁, A) = ⊥
12.     then optimize(D, A, p₁);
13.     for each B in reach(p₁, A) do
14.         if opt(p₂, B) = ⊥
15.         then optimize(D, B, p₂);
16.         if opt(p₂, B) ≠ ∅
17.         then opt(p, A) := opt(p, A) ∪ opt(p₁, A)/opt(p₂, B);
18.              reach(p, A) := reach(p, A) ∪ reach(p₂, B);
19. (5) //p₁: /* reach(//, A) and recrw(A, B) have been */
            precomputed by procedure recProc(A) given in Fig. 6 */
20.     for each B in reach(//, A) do
21.         if opt(p₁, B) = ⊥
22.         then optimize(D, B, p₁);
23.         if opt(p₁, B) ≠ ∅
24.         then opt(p, A) := opt(p, A) ∪ recrw(A, B)/opt(B, p₁);
25.              reach(p, A) := reach(p, A) ∪ reach(B, p₁);
26. (6) p₁ ∪ p₂:  if opt(p₁, A) = ⊥
27.               then optimize(D, A, p₁);
28.               if opt(p₂, A) = ⊥
29.               then optimize(D, A, p₂);
30.     if simulate(image(p₁, A), image(p₂, A))
31.     then opt(p, A) := opt(p₂, A);  reach(p, A) := reach(p₂, A);
32.     else if simulate(image(p₂, A), image(p₁, A))
33.     then opt(p, A) := opt(p₁, A);  reach(p, A) := reach(p₁, A);
34.     else opt(p, A) := opt(p₁, A) ∪ opt(p₂, A);
35.          reach(p, A) := reach(p₁, A) ∪ reach(p₂, A);
36. (7) ε[q]:  if opt([q], A) = ⊥
37.           then evaluate(A, [q]);
38.           if opt([q], A) = true
39.           then opt(p, A) := ε;  reach(p, A) := {A};
40.           else if opt([q], A) = false
41.           then opt(p, A) := ∅;  reach(p, A) := ∅;
42.           else opt(p, A) := ε[opt([q], A)];  reach(p, A) := {A};
43. return opt(p, A);
```

FIG. 8

METHOD AND APPARATUS FOR SECURE PROCESSING OF XML-BASED DOCUMENTS

FIELD OF THE INVENTION

The present invention relates to a method and apparatus for processing XML data and, more particularly, for developing security views of information contained within a larger assembly or organization of such information.

DESCRIPTION OF THE BACKGROUND ART

XML (Extensible Markup Language) is rapidly emerging as the new standard for data representation and exchange on the Internet. As corporations and organizations increasingly employ the Internet as a means of improving business-transaction efficiency and productivity, it is increasingly common to find operational data and other business information in XML format. In light of the sensitive nature of such business information, securing XML content and ensuring the selective exposure of information to different classes of users based on their access privileges is important. Specifically, for an XML document T there may be multiple user groups who want to query the same document. For these user groups, different access policies may be imposed, specifying what elements of T the users are granted access.

Access control models for XML data have been proposed; however, these models suffer from various limitations. For example, such models may reject proper queries and access, incur costly runtime security checks for queries, require expensive view materialization and maintenance, or complicate integrity maintenance by annotating the underlying data. More specifically, for a number of different users, having corresponding different access policies, each node in the XML document (i.e., the actual XML data) would have to be annotated to define such users' with the various levels of access allowed based on their individual user profiles. While such annotating may be easily performed if there are only a few user groups, annotating becomes increasingly complex as the number of user groups and corresponding access policies increases. There is also an undesirable possibility of generating errors in the XML document or in the XML data during the annotation process. Maintenance costs of the XML data also increases if it desired to modify a document at some point in the future. For example, adding a subtree of new elements in the XML data will require further annotating for each of the existing user groups again with the possibility of errors being generated in the data during this process.

Additionally, and with regard to user views, it is conceivable that many hundreds or possibly thousands of different views must be generated to satisfy all of the combinations of queries and users that the XML document serves. Such views are costly to prepare and maintain, as well as providing the specific XML data (which may be subject to tampering or error generation) as a result of view usage. Additionally, users are not provided with the exact structure of the data. As such, they do not know how to properly formulate a query which creates an overall inefficient system for storing, maintaining and subsequently accessing data. A more subtle problem is that none of these earlier models provides users with a Document Type Definition (DTD) characterizing the information that users are allowed to access. Some models expose the full document DTD to all users, and make it possible to employ (seemingly secure) queries to infer information that the access control policy was meant to protect. Accordingly, there is a need to provide access to XML data of an XML document without corrupting or otherwise changing the XML data and provide suitable query interaction with such data.

SUMMARY OF THE INVENTION

Various deficiencies of the prior art are addressed by the present invention of a method for providing controlled access to an XML document by defining at least one access control policy for a user of the XML document and deriving a security view of the XML document for the user based upon said access control policy and schema level processing of the XML document. The invention also includes a step of translating a user query based on the security view of the XML document to an equivalent query based on the XML document.

Deriving a security view includes invoking a first sub process that determines if a first accessible element type of an XML document DTD representing said XML document has been previously processed. If the first accessible element type has not been previously processed, then the first sub process performs the steps of computing a query annotation for each child element in a production rule of the first accessible element type computing a view production rule for first accessible element type in a view DTD representing an accessible portion of the XML document and computing a security view for each child element in the production rule of the first accessible element type. Computing a security view for each child element in the production rule of the first accessible element type includes invoking a second sub process if a child element in the production rule of the first accessible element type is inaccessible; otherwise, the first sub process is invoked for said child element. Translating the user query based on the security view of the XML document includes iteratively computing at least one local translation corresponding to at least one subquery of the first accessible element type that is part of the user query. The method can be practiced by a computer readable medium containing a program which, when executed, performs these operations.

Additionally, the invention includes an apparatus for performing an operation of securely providing access to XML data of an XML document that includes means for defining an access control policy for a user of the XML document and means for deriving a security view of the XML document for the user based on said access control policy and schema level processing of the XML document. The apparatus also includes means for translating a user query based on the security view of the XML document to an equivalent query based on the XML document.

The means for defining the access control policy includes an access specification that annotates a document DTD representing the XML document. Such an access specification can be derived by a database manager of the XML document. The means for deriving a security view of the XML document for the user includes a security view definition that defines query annotations in a document DTD representing the XML document. The means for translating a user query based on the security view of the XML document to an equivalent query based on the XML document includes a query evaluator that maps one or more nodes in the security view to corresponding one or more nodes in the document DTD representing the XML document. In this way, access of specific information in the XML document is provided only to those having the proper access specification and corresponding view without having to annotate or otherwise process the actual data in the XML document.

BRIEF DESCRIPTION OF THE DRAWINGS

The teachings of the present invention can be readily understood by considering the following detailed description in conjunction with the accompanying drawings, in which:

FIG. 5 depicts a preferred embodiment of a method of deriving a security view based upon a security specification shown in pseudo code;

FIG. 6 depicts a preferred embodiment of a method of rewriting queries by a first user using the security view shown in pseudo code;

FIG. 7 depicts a series of diagrams to account for query rewriting of a recursive view DTD;

FIG. 8 depicts a preferred embodiment for optimizing query rewriting in accordance with the subject invention;

To facilitate understanding, identical reference numerals have been used, where possible, to designate identical elements that are common to the figures.

DETAILED DESCRIPTION

This invention will be described within the context of Extensible Mark Up Language (XML). Consider an XML document T having any number of data elements arranged therein. A Document Type Definition (DTD) D is associated with T which governs the organization or exact structure of the data (also referred to as schema information). Multiple access control policies are declared over T at the same time, each specifying, for a class of users, what elements in T the users are granted, denied, or conditionally granted access to. A language is defined for specifying fine-grained access control policies. An access specification S expressed in the language is an extension of the document DTD D associating element types with security annotations (i.e., XPath qualifiers), which specify structure- and content-based accessibility of the corresponding elements of these types in T. Since the primary concern is with querying XML data, the specification language adopts a simple syntax instead of the conventional (subject, object, operation) syntax.

An access specification S is enforced through an automatically-derived security view $V=(D_v, \sigma)$, where $D_v$ is a view DTD and $\sigma$ is a function defined via XPath queries. The view DTD $D_v$ exposes only accessible data with respect to S, and is provided to users authorized by S so that they can formulate their queries over the view. The function ca is transparent to authorized users, and is used to extract accessible data from T. The only structural information about T that the users are aware of is $D_v$, and no information beyond the view can be inferred from user queries. Thus, the security views support both access/inference control and schema availability. An efficient algorithm is provided that, given an access specification S, derives a security view definition V, i.e., V characterizing all and only those accessible elements of T with respect to S based on schema level processing of the DTD D rather than merely annotating data within the document T.

Figure 1:
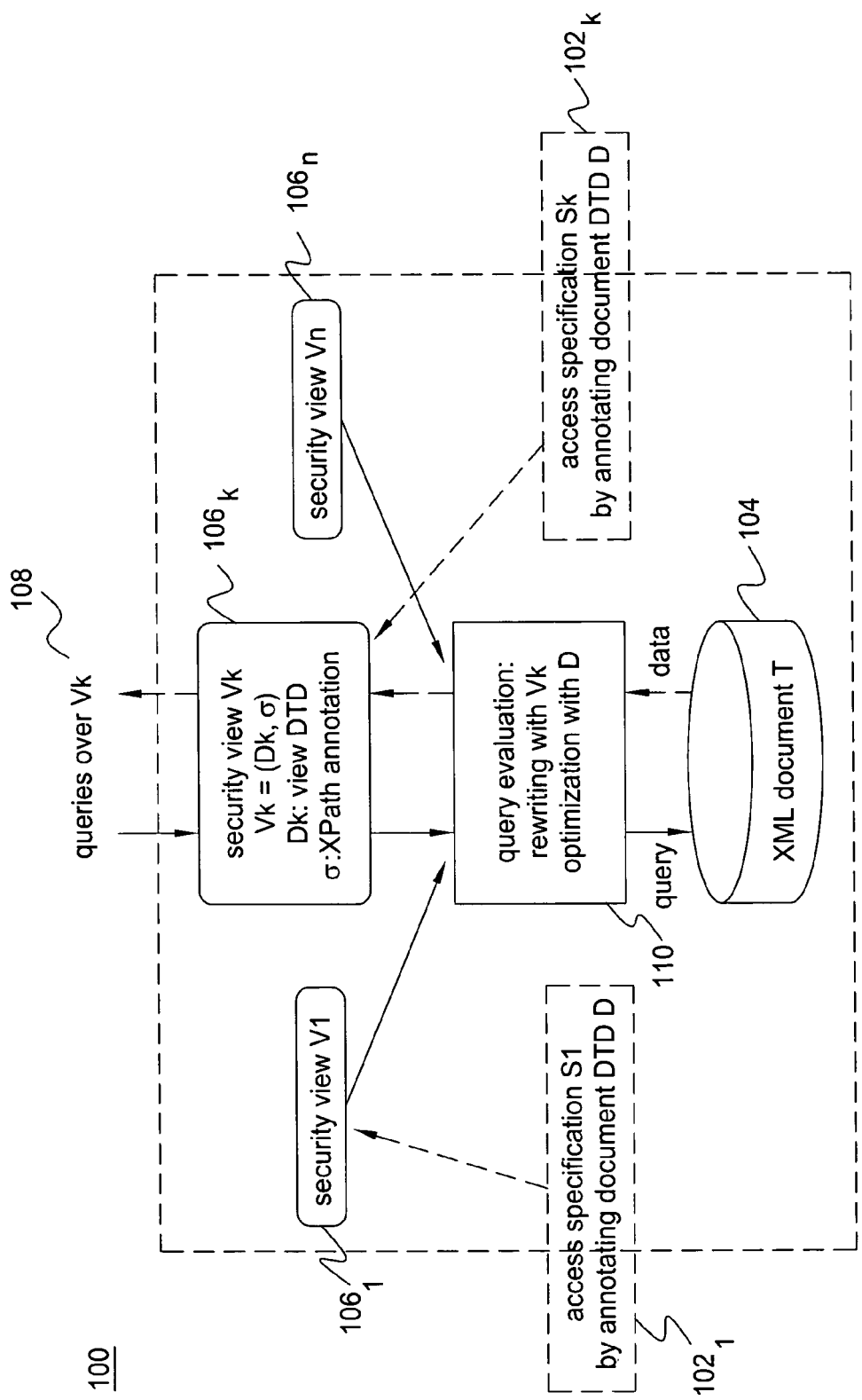
FIG. 1 depicts a conceptual model of the subject invention and how it interacts with an XML document.

Accordingly, an access control model 100 based on security views for an XML document 104 is presented and conceptually depicted in FIG. 1. For each access control policy, a security administrator (or DBA) defines a specification S $102_1 \ldots 102_k$ by annotating a document DTD D associated with the XML document 104 (e.g., through a simple GUI tool). For each specification $S_{1 \ldots k}$, a security view definition $V_1 \ldots V_n$ 106 is automatically derived by a view-derivation algorithm. A corresponding security-view DTD $D_v$ is exposed to users authorized by S so that they can formulate and pose their queries 108 over the security view V. The security view is virtual, and a query 108 labeled p over V is evaluated 110 by efficiently rewriting to an equivalent query $p_t$ over the original document T 104 by incorporating XPath queries in $\sigma$. Additionally, the subject invention includes algorithms to optimize $p_t$ by exploiting the document DTD D. Finally, the optimized query $p_t$ is executed over T and its result is returned to the users. Note that S, $\sigma$, and D are invisible to users. Security issues are handled at the query-rewriting level and are completely hidden from users of the view. In this manner, the invention provides a flexible, secure framework for querying XML data that overcomes the limitations of earlier proposals.

Figure 2:
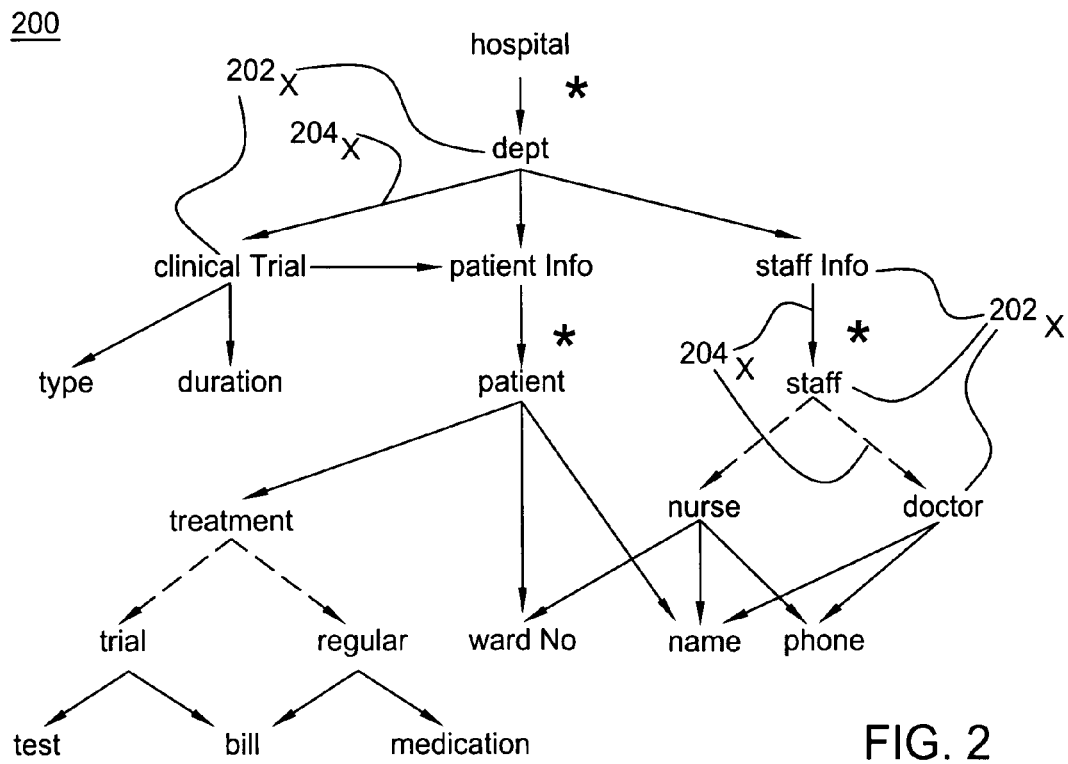
FIG. 2 depicts an exemplary document DTD that is managed in accordance with the subject invention.

The concepts of the subject invention are best realized when considering the following specification concurrently with the figures as follows. For example, FIG. 2 depicts a document type definition (DTD) of a hospital document that is accessed by a large number of users (doctors, nurses, patients and the like). The DTD is represented as a graph 200 having a plurality of nodes $202_x$ interconnected by a plurality of edges $204_x$. (Note: not all of the nodes and edges have been labeled for sake of clarity). Each of the nodes $202_x$ represents a different data element in the DTD while the edges $204_x$ represent the mapping (in this example a tree type mapping) that identifies the relationship between each of the elements in the DTD 200. Consider that in such a DTD, a hospital wants to impose a security policy that authorizes nurses to access all patient data except for information concerning whether a patient is involved in clinical trials. In order to provide access to approved information yet prevent access to unapproved information, a security or access specification is required for nurses that conforms to this DTD.

Figure 3:
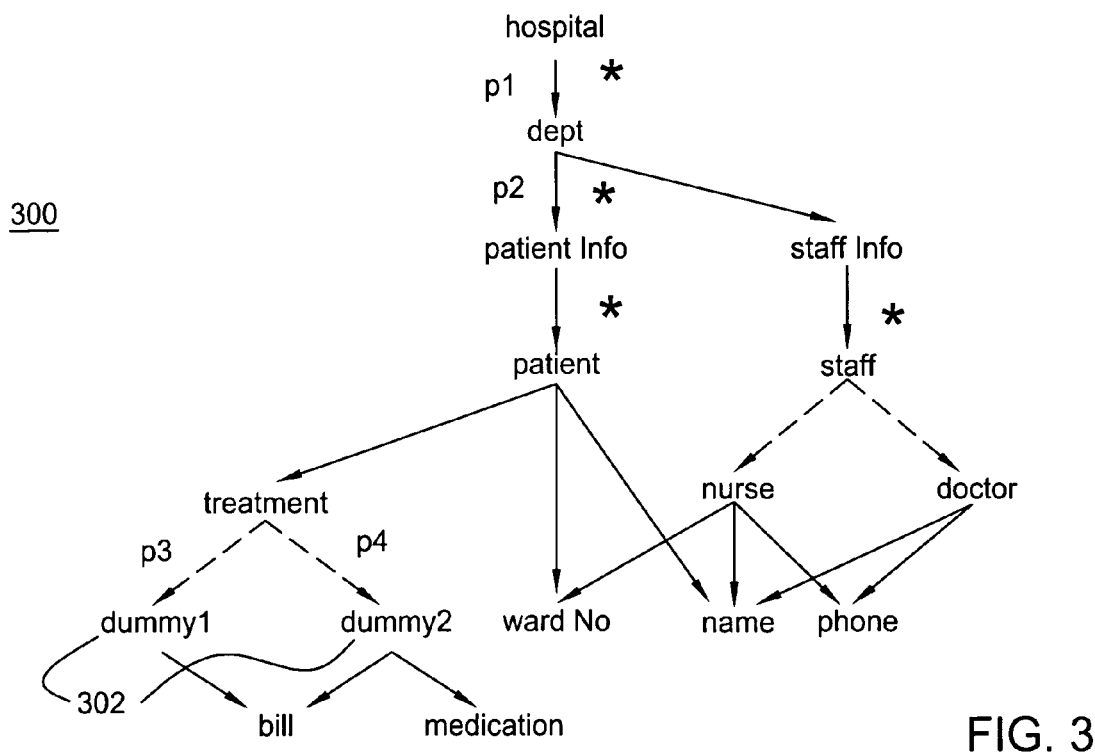
FIG. 3 is a security view of the exemplary document DTD of FIG. 2 for one particular user or user group having a first user access profile or specification.
Figure 4:
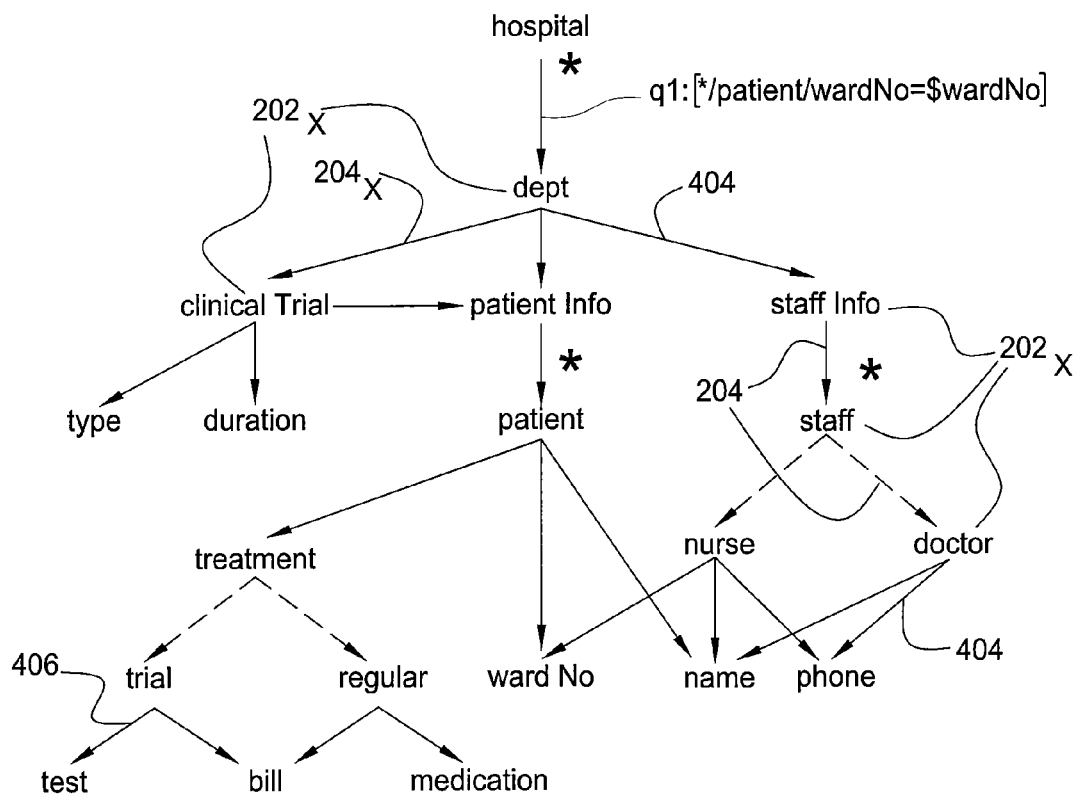
FIG. 4 depicts a graphical representation of the first user access profile or specification in comparison to the exemplary document DTD of FIG. 2.

FIG. 3 depicts a security view 300 resulting from the creation and evaluation of a security or access specification 400 in accordance with the subject invention and seen in greater detail in FIG. 4. In particular, the access specification 400 is an extension of the document DTD 200 associating security annotations with productions of D. The access specification 400 has nodes 202x and edges 204x similar to the DTD of FIG. 2, only with specific regard to the material that a nurse will have access to. Specifically, D is defined to be (D, ann), where ann is a partial mapping such that, for each production A→α and each element type B in α, ann (A,B), if explicitly defined, is an annotation of the form:

$$ann(A,B)::=Y|[q]|N,$$

where [q] is a qualifier in a fragment C of XPath. Intuitively, a value of Y, [q], or N for ann (A,B) indicates that the B children of A elements in an instantiation of D are accessible, conditionally accessible, and inaccessible, respectively. If ann (A,B) is not explicitly defined, then B inherits the accessibility of A. On the other hand, if ann (A,B) is explicitly defined it may override the accessibility of A. The root of D is annotated Y by default. This specification is depicted in FIG. 4, where bold edges (e.g. 404, not all labeled, but plainly visible) represent 'Y' or '[q]' annotations, while normal edges 406 represent 'N' annotations. Thus, nurses can only access the patient and staff information in a dept having a certain ward (restricted by the qualifier q1). Moreover, they are not authorized to know which patients are involved in clinical trials as well as the form of treatment, except for bill and medication information.

For an XML instance T of a DTD D, an access specification S=(D, ann) can be easily defined, e.g., using a simple GUI tool over D's DTD graph. Furthermore, S unambiguously defines the accessibility of document nodes in T. To see this, note that DTD D must be unambiguous by the XML standard. Since T is an instance of D, this implies that each B element $\upsilon$ of T has a unique parent A element and a unique production that "parses" the A subtree; thus, $\upsilon$'s accessibility ann ($\upsilon$) can be defined to be exactly the ann (A,B) associated with the production for A. We say that $\upsilon$ is accessible with respect to S if and only if either (1) ann($\upsilon$) is Y or ann($\upsilon$) is [q] and [q] is true at $\upsilon$, and, moreover, for all ancestors $\upsilon'$ of $\upsilon$ such that ann($\upsilon'$)=[q'], the qualifier [q'], is true at $\upsilon'$; or, (2) ann($\upsilon$) is not explicitly defined but the parent of $\upsilon$ is accessible with respect to S. Note that for $\upsilon$ to be accessible, the qualifiers associated with all ancestors of $\upsilon$ must be true. Referring to the example of FIGS. 2, 3 and 4, for a nurse to access the information of a department d, the qualifier q1 (see FIG. 4) associated with dept must be true at d, so that the nurse is prevented from unauthorized access to information of different departments.

FIG. 3 depicts a security view $\upsilon$ 300 from the access specification 400 discussed previously to a view DTD $D_\upsilon$ for nurses. The view DTD removes information about inaccessible nodes such as "clinicalTrial", and introduces "dummy" labels 302 dummy1, dummy2 to hide the label information of regular and trial, while retaining the disjunctive semantics at the accessible "treatment" node. Recall that $\epsilon$ denotes the empty path. The view DTD is provided to the nurses, while the XPath mapping σ, is not visible to them. Since the nurses can not see the document DTD, they have no knowledge about what the dummies stand for.

A security view 300 defines a mapping from instances of a document DTD D to instances of a view DTD $D_\upsilon$ that is automatically derived from a given access specification 400. Let S=(D,ann) be an access specification. A security view definition (or simply a security view) V from S to a view DTD $D_\upsilon$, denoted by V:S→$D_\upsilon$, is defined as a pair V=($D_\upsilon$,σ), where σ defines XPath query annotations used to extract accessible data from an instance T of D. Specifically, for each production A→α in $D_\upsilon$ and each element type B in α, σ(A,B) is an XPath query (in our class C) defined over document instances of D such that, given an A element, σ(A,B) generates its B sub elements in the view by extracting data from the document. A special case is the unary parameter usage with σ($r_\upsilon$)=r, where $r_\upsilon$ is the root type of $D_\upsilon$ and r is the root of D, i.e., σ maps the root of T to the root of its view.

The semantics of a security view definition V:S→$D_\upsilon$ are given by presenting a materialization strategy for V. Given an instance T of the document DTD, a view of T is built, (denoted by $T_\upsilon$) that conforms to the view DTD $D_\upsilon$ and consists of all and only accessible nodes of T with respect to S. Then, a top-down computation is performed by first extracting the root of T and treating it as the root of $T_\upsilon$, and then iteratively expanding the partial tree by generating the children of current leaf nodes. Specifically, in each iteration each leaf $\upsilon$ is inspected. Assume that the element type of $\upsilon$ is A and that the A production in $D_\upsilon$ is P(A)=A→α. The children of $\upsilon$ are generated by extracting nodes from T via the XPath annotation σ(A,B) for each child type B in α. The computation is based on the structure of production P(A) as follows:

(1) Nothing needs to be done when P(A) is A→$\epsilon$ (2) P(A)=A→str. Then, the query p defined in (A,str) is evaluated at context node $\upsilon$ in T. If $\upsilon$[[p]] returns a single text node in T that is accessible with respect to S, then the text node is treated as the only child of $\upsilon$; otherwise, the computation aborts.

(3) P(A)=A→$B_1$ ..., $B_n$. Then, for each i $\in$ [1,n], the query $p_i$=σ(A,$B_i$) is evaluated at context node $\upsilon$ in T. If for all i $\in$ [1,n], $\upsilon$[[$p_i$]] returns a single node $\upsilon_i$ accessible with respect to S, then $\upsilon_i$ is treated as the $B_i$ child of $\upsilon$; otherwise, the computation aborts.

(4) P(A)=A→$B_1$+ . . . +$B_n$. Then, for each i $\in$ [1,n], the XPath query $p_i$=σ(A, $B_i$) is evaluated at context node $\upsilon$ in T. If there exists one and only one i $\in$ [1,n] such that $\upsilon$[[$p_i$]] returns a single node accessible with respect to S, then the node is treated as the single child of $\upsilon$; otherwise, the computation aborts.

(5) P(A)=A→B*. Then, the query p=σ(A,B) is evaluated at context node $\upsilon$ in T. All the nodes in $\upsilon$[[p]] accessible with respect to S are treated as the B children of $\upsilon$, ordered by the document order of T. Note that, if $\upsilon$[[p]] is empty, no children of $\upsilon$ are created.

A novel algorithm (termed "derive") is presented that, given an access specification S=(D,ann), automatically computes a security view definition V=($D_\upsilon$,σ) with respect to S such that, for any instance T of the document DTD, if the computation of $T_\upsilon$ terminates (i.e., does not abort), it comprises all and only accessible elements of T with respect to S. One embodiment of algorithm "derive" is shown in FIG. 5 as a series of pseudo code steps 500. When building V=($D_\upsilon$,σ), the algorithm hides inaccessible nodes in the document DTD D by either short-cutting them, or renaming them using dummy labels. It uses two procedures, Proc_Acc(S,A) and Proc_InAcc(S,A), to deal with accessible and inaccessible element types A of D, respectively. It traverses the document DTD D top-down by invoking Proc_Acc(S,r), where r is the root element type of D. For each accessible element type A encountered, Proc_Acc(S,A) constructs a production $P_\upsilon$(A)= A→α in the view DTD $D_\upsilon$, and computes appropriate XPath queries σ(A,B)=$p_B$ for each type B in α, based on the A-production in the document DTD D (cases 1-4 presented above). More specifically, (a) if B is accessible, then $p_B$ is simply 'B' (steps 6,7);

(b) if B is conditionally accessible (i.e., ann(A,B)=[q]), then $p_B$ is 'B'[q], i.e., qualifiers in S are preserved (steps 8, 9); and, (c) if B is inaccessible, then the algorithm either prunes the entire inaccessible subgraph below B if B does not have any accessible descendants (step 11), or 'shortcuts' B by treating the accessible descendants of B as children of A if this does not violate the DTD-schema form of Section 2 (steps 12-15), or renames B to a "dummy" label to hide the label B while retaining the DTD structure and semantics (steps 16-20). Children of the B node are then processed in the same manner. In this way, the resultant view DTD $D_v$, preserves the structure and semantics of the relevant and accessible parts of the original document DTD.

The procedure Proc InAcc(S,A) processes an inaccessible node A in a similar manner. One difference is that it computes (1) reg(A) instead of a in the A-production A→α in the view DTD $D_v$, and (2) path [A,B] for each element type B in reg(A) rather than σ(A,B). Intuitively, reg(B) is a regular expression identifying all the closest accessible descendants of B in D, and path [A,B] stores the XPath query that captures the paths from A to B in the document DTD. Another difference concerns the treatment of recursive node. If an inaccessible A is encountered again in the computation of Proc_InAcc(S,A), then A is renamed to a dummy label and retained in the regular expression returned.

To efficiently compute V, Algorithm "Derive" associates two Boolean variables visited[A, acc] and visited[A, inacc] (initially false) with each element type A in the document DTD D. These variables indicate whether A has already been processed as an accessible or inaccessible node, respectively, to ensure that each element type of D is processed only once in each case. In light of this, the algorithm takes at most $O(|D|^2)$ time, where $|D|$ is the size of the document DTD.

Figure 9:
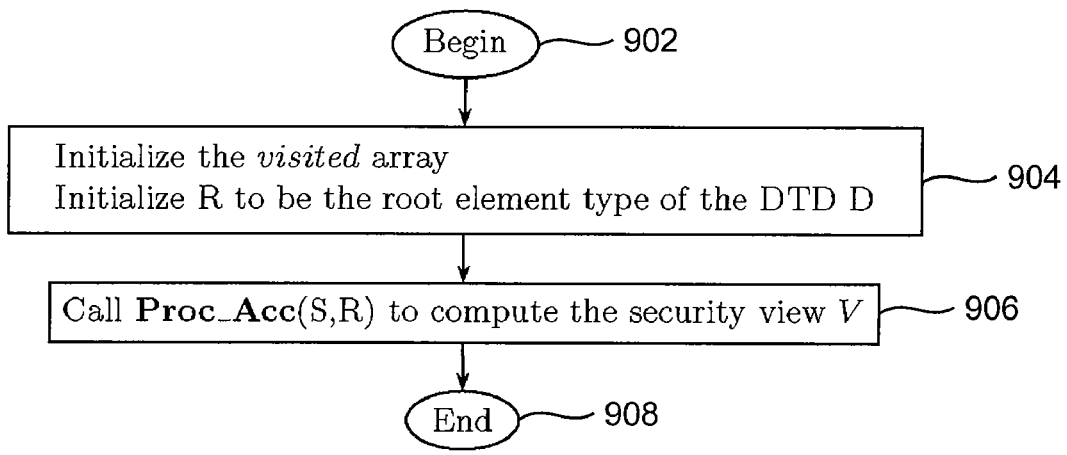
FIG. 9 depicts a flow chart for practicing the method and pseudo code of FIG. 5.

A more general depiction of the inventive concept is shown in FIG. 9. Specifically, FIG. 9 depicts a flow chart 900 having a series of steps for practicing the algorithm "Derive". Specifically, the method begins at step 902 and proceeds to step 904 wherein the Boolean variables "visited" are initialized. In this particular example, the initialization of value is "false". Additionally at step 904, R is initialized to be the root element type of the DTD D which is being processed. At step 906, processing of the security view begins by invoking an accessible element procedure with respect to the predetermined security specification S and the root element R. In this manner, the aforementioned top down processing of each element type in the DTD D is analyzed and appropriate productions, queries or regular expressions are subsequently assigned to compute a security view V. In one embodiment of the invention, the invoked procedure is referred to as "Proc_Acc (S,R)" and is described in greater detail below. The method ends at step 908.

Figure 10:
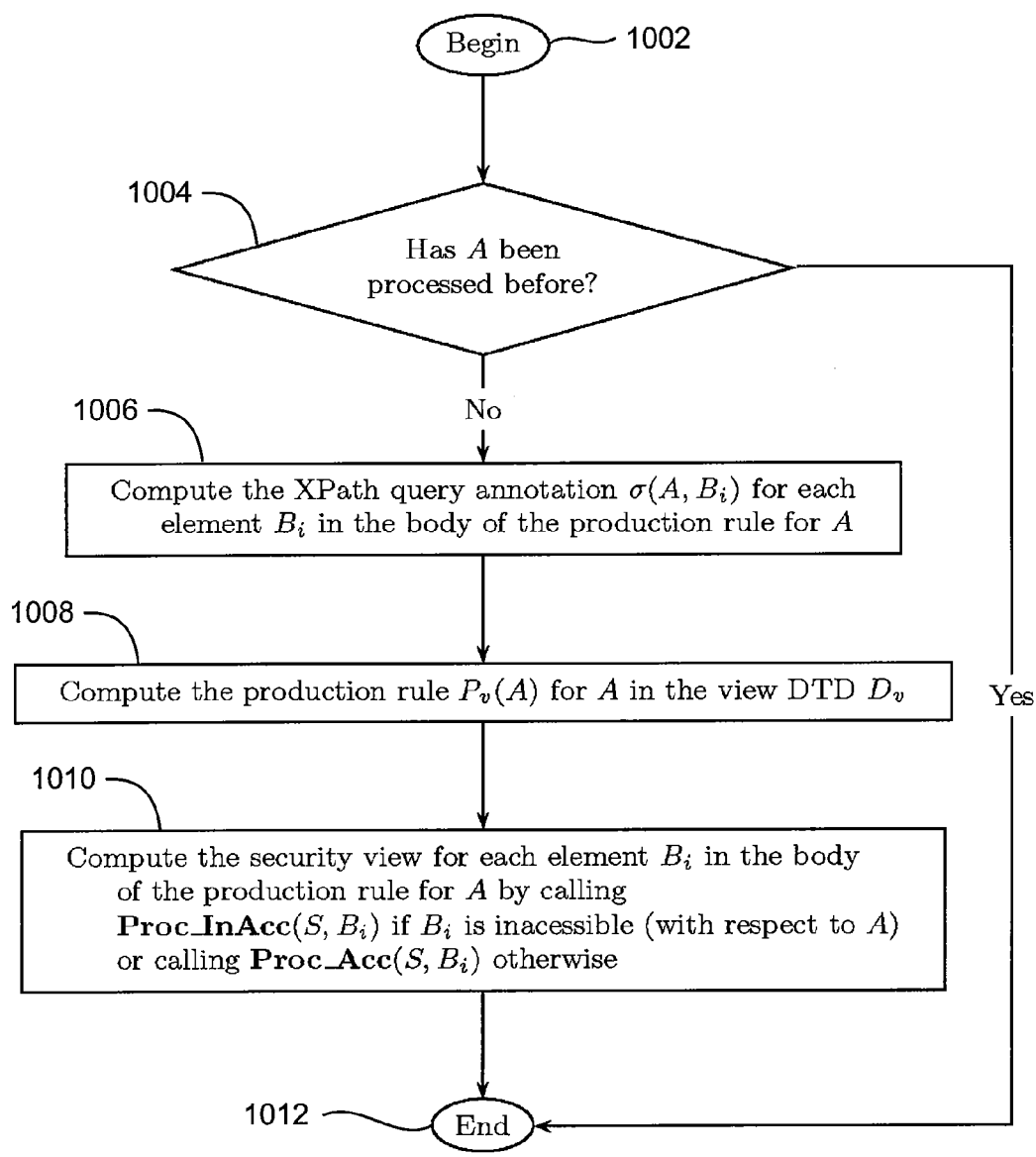
FIG. 10 depicts a flow chart for practicing a first sub process of the method and pseudo code of FIG. 5.

FIG. 10 depicts Proc_Acc (as identified in step 906 of FIG. 9) as a series of method steps 1000. Specifically, algorithm Proc_Acc begins at step 1002 and proceeds to step 1004 where a first element type (for example element type A underneath root R) goes under a query to determine if such element type has been previously processed. In one particular example, the query is determined by evaluating the visited (A, acc) variable. If the answer to the query is yes (that element type A has been previously processed) the method proceeds to step 1012 where the algorithm ends.

If the element type has not been previously processed, the method moves to step 1006 where a first computation is performed. Specifically, query annotation (for example denoted by the function σ) is computed for each child element $B_i$ in the production rule for the element type A currently being processed. In one particular example, the query annotation is XPath query annotation. Once the query annotation is computed, the method proceeds to step 1008 to compute a view production rule $P_v(A)$ for the element type A in the view DTD $D_v$. Once the computation of the view production rule is completed, the method moves to step 1010 where a security view for each child element $B_i$ in the production rule for A is computed. In one embodiment of the invention, this computation is performed by invoking a process for inaccessible nodes if the child element $B_i$ is inaccessible (with respect to A) otherwise the accessible element procedure for such $B_i$ is called. After the security view is computed for each element $B_i$, the method ends at step 1012.

Figure 11:
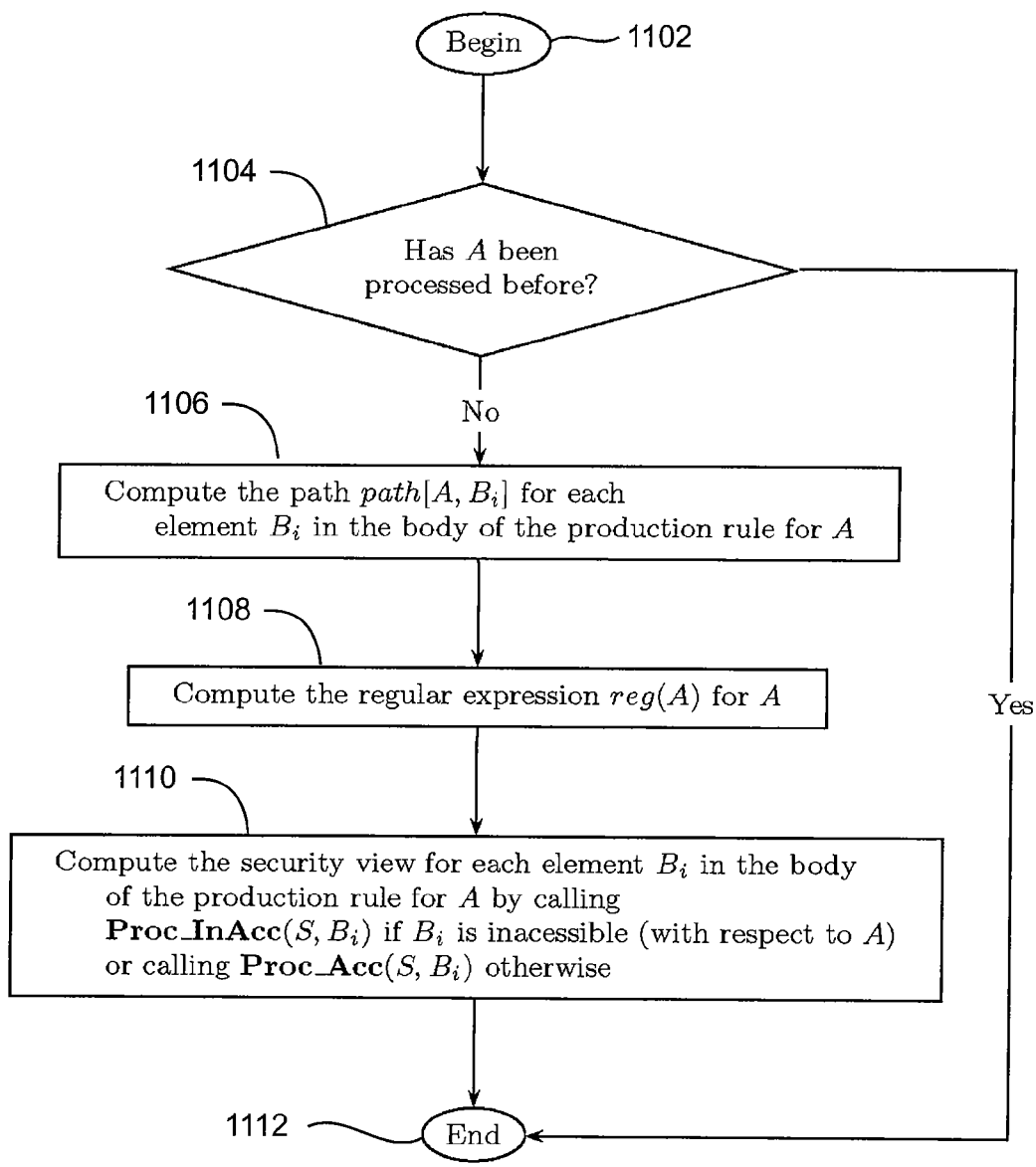
FIG. 11 depicts a flow chart for practicing a second sub process of the method and pseudo code of FIG. 5.

FIG. 11 depicts the algorithm for inaccessible nodes (referred to in one embodiment of the invention as Proc_InAcc) as a series of method steps 1100. Proc_InAcc is similar in execution to Proc_Acc with the difference being in the values that are computed based on the inaccessibility of the elements as detailed below. Specifically, the method starts at step 1102 and proceeds to step 1104 where a first query is performed to determine if the element type A currently being evaluated has been previously processed. As discussed above, this is accomplished via analysis of the Boolean variable visited (A, InAcc). If the answer to the query is yes, the method proceeds to step 1112 and the method ends.

If the answer to the query is no, the method moves to step 1106 where a path for each child element $B_i$ in the production of A is computed. Particularly and in one embodiment of the invention, the path is computed as Path [A, $B_i$] which is a value that stores the XPath query that captures the paths from A to B in the document DTD as discussed previously. Once the path has been computed, the method moves to step 1108 where a regular expression for A is computed. More specifically and as previously discussed, the value reg [A] is computed instead of α (reg[A] is defined as a regular expression identifying all the closest descendants of A in D). Once the regular expression for A has been computed, the method moves to step 1110 where the security view for each child element $B_i$ in the production rule for A is computed. Specifically in one embodiment of the invention the security view is computed by calling Proc_InAcc if such child element $B_i$ is inaccessible with respect to A, otherwise, Proc_Acc is called for $B_i$. Once the security view for each child element $B_i$ is computed, the method ends at step 1112.

Once an access policy is determined, and a corresponding security view is derived for a particular user or user group, such user or user group can pose a query on the security view. The query allows the user to access information in the DTD according to such access policy without reviewing information that the user is not allowed to have access to. Further, in accordance with the subject invention, the actual data in the DTD or XML document is not accessed or made otherwise made available to the user for the possible situation of unauthorized tampering or otherwise error-creating accessing of the information. This is accomplished by the novel method of the query rewriting. That is, given an query p over the security view, p is automatically transformed to another XPath query $p_t$ over the document DTD D such that, for any instance T of D, p over $T_v$ and $p_t$ yield the same answer. In other words, p over the view is equivalent to $p_t$ over the original document (i.e., $p_t(T)=p(T_v)$). This eliminates the need for materializing views and its associated problems.

Specifically, given a query p over the view DTD $D_v$, a rewriting algorithm "evaluates" p over the DTD graph $D_v$. For each node A reached via p from the root r of $D_v$, every label path leading to A from r is rewritten by incorporating the security-view annotations σ along the path. As a maps view nodes to document nodes, this yields a query $p_t$ over the document DTD D.

To implement this idea, the algorithm works over the hierarchical, parse-tree representation of the view query p and uses the following set of variables. For any sub-query p' of p and each node A in $D_v$, rw(p',A) is used to denote the local translation of p' at A, i.e., a query over D that is equivalent to p' when p' is evaluated at a context node A. Thus, rw(p,r)=$p_t$ is what the algorithm needs to compute. Reach (p',A) is also used to denote the nodes in $D_v$ that are reachable from A via p'. Finally, N is used to denote the list of all the nodes in $D_v$, and Q to denote the list of all sub-queries of p in "ascending" order, such that all sub-queries of p' (i.e., its descendants in p's parse tree) precede p' in Q.

Given the above, one embodiment of this Algorithm is identified as "Rewrite" and is presented in FIG. 6 as a series of pseudo code steps 600. The algorithm is based on dynamic programming, that is, for each sub-query p'of p and node A in $D_v$, Algorithm "Rewrite" computes a local translation rw (p',A). To do this, "Rewrite" first computes rw ($p_i$, $B_i$) for each (immediate) sub-query $p_i$ of p' at each possible view DTD node $B_i$ under A; then, it combines these rw($p_i$, $B_i$)'s to get rw(p',A). The details of this combination are determined based on the formation of p' from its immediate sub-queries $p_i$, if any. The computation is carried out bottom-up via a nested iteration over the lists of sub-queries Q and DTD nodes N. Each step of the iteration computes rw(p',A) for some p' and A, starting from the "smallest" sub-queries of p. At the end of the iteration pt=rw(p,r) is obtained.

Figure 12:
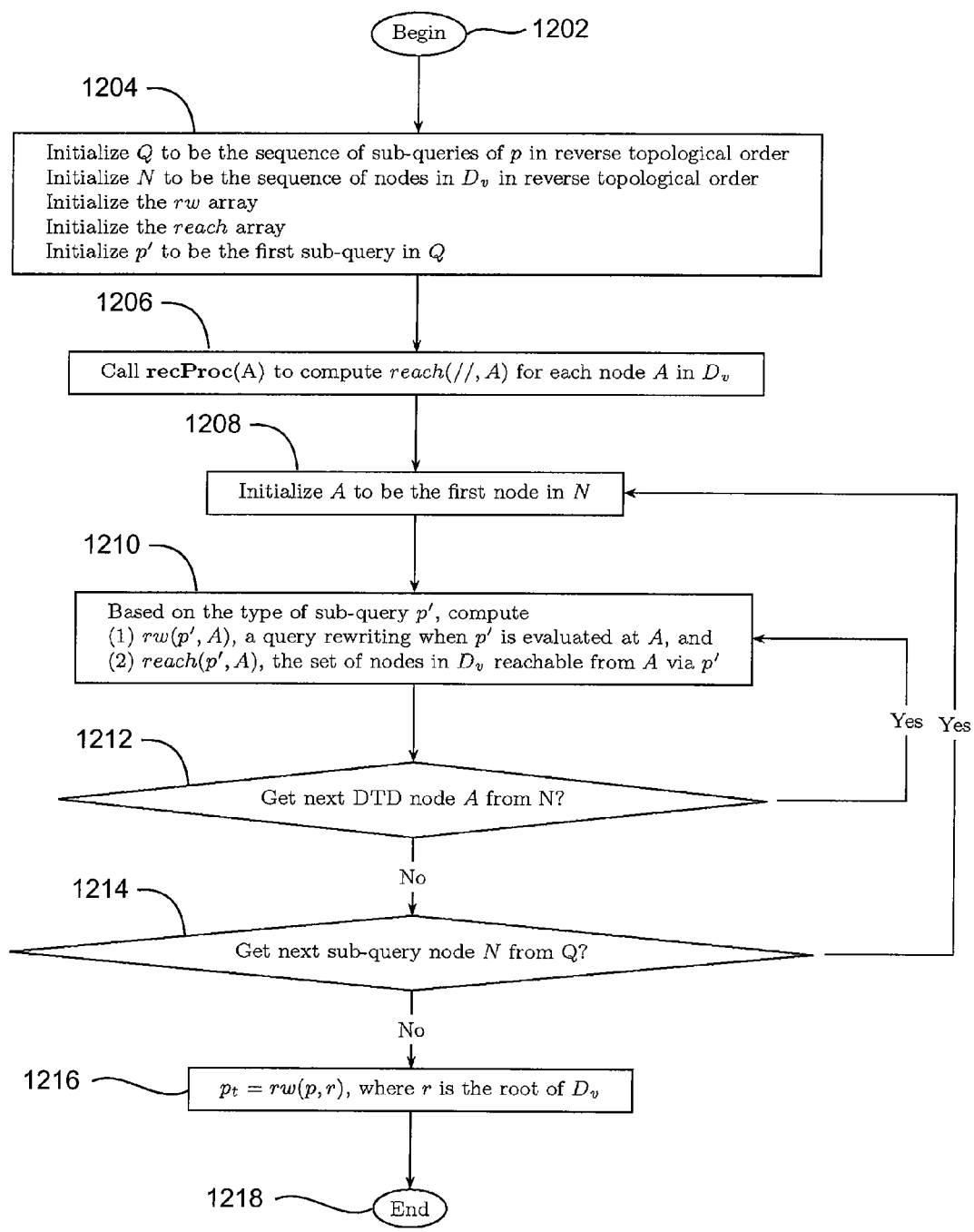
FIG. 12 depicts a flow chart for practicing the method and pseudo code of FIG. 6

In one embodiment of the method for query rewriting, the algorithm is generally shown as a series of method steps 1200 in FIG. 12. The algorithm receives as input a Security View V and a query p over the view DTD $D_v$ and outputs an equivalent query $p_t$ over the entire document DTD D. This is accomplished by starting the method at step 1202 and proceeding to step 1204 where a series of parameter value initializations are performed. Examples of such parameter initializations are selected from the group consisting of Q (which denotes a sequence of sub-queries of p in reverse in topological order), N (which denotes a sequence of nodes in the view DTD in reverse topological order), arrays for values rw and reach and p' (which denotes a first sub-query in Q).

Once the initializations are performed, the method proceeds to step 1206 where a first sub process is called to compute a variable reach (//A) for each node A in the view DTD. Reach(//,A) is the set of descendant nodes of A in the view DTD $D_v$. The method then proceeds to step 1208 where the value of A is initialized to be the first node in N. The method then proceeds to step 1210 where computations of the values for rw (p', a) and reach (p'a) are computed based on the type of sub-query p'.

Once those values are computed, the method moves to 1212 where an inquiry is made if a next node A from the sequence of nodes N is available. If the answer to the inquiry is yes, the method loops back to step 1210 where values for rw and reach are computed for the next node A value. If the answer to the query is no, the method moves to step 1214 where another query is posed. Specifically, if there is a next sub-query in the present node N in the sequence of sub-queries Q, then the method loops back to step 1208 to reinitialize A as the first node in N. If the answer to the query is no, the method proceeds to step 1216 where the equivalent query pt is assigned the value of rw(p,r) where r is the root of the view DTD Dv. The method ends at step 218.

Figure 13:
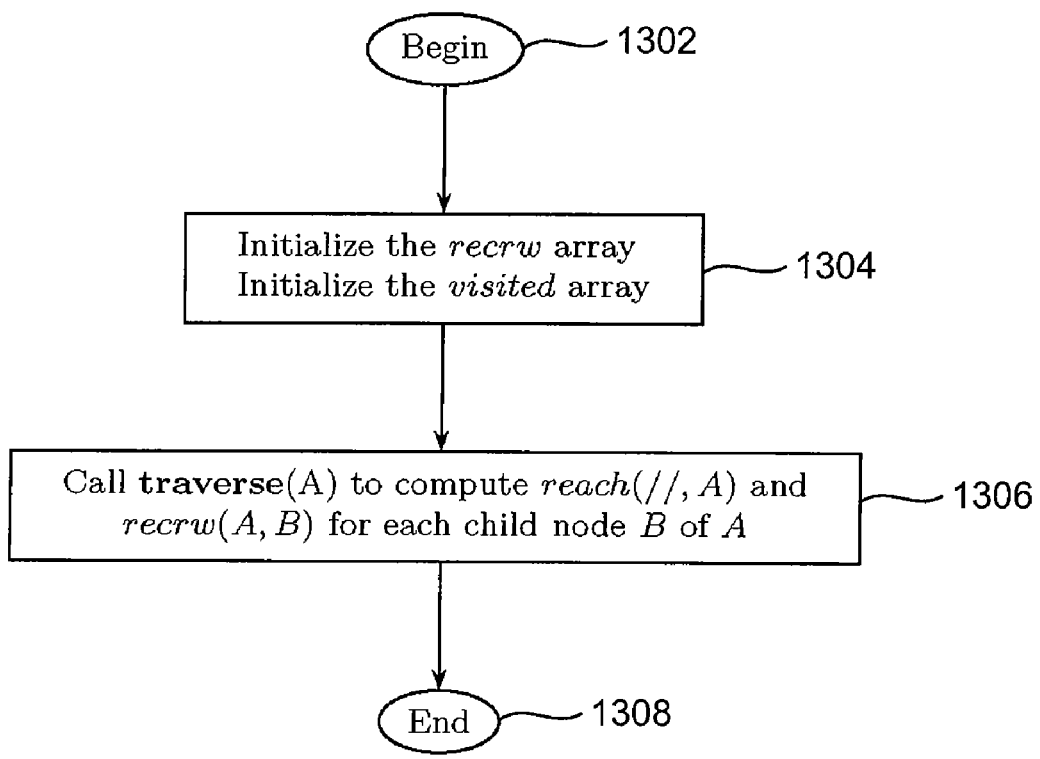
FIG. 13 depicts a flow chart for practicing a first sub process of the method and pseudo code of FIG. 6.

Earlier per step 1206 a first subroutine was introduced that computes the value reach (//,A). This particular subroutine in one embodiment of the invention is identified as algorithm "recProc" and is shown as a series of method steps 1300 in FIG. 13. Algorithm recProc receives a node A in the view DTD as input and calculates the value reach (//,A) and a value recrw (AB) for each child B in the value reach (//,A). Specifically, the method starts at step 1302 and proceeds to step 1304 where values for the arrays recrw and visited are initialized. One the initialization is complete, the method moves to 1306 where a second sub process is called to compute the value reach (//,A) and (recrwAB) for each child node B of A. Subsequently, the method ends at the 1308.

Figure 14:
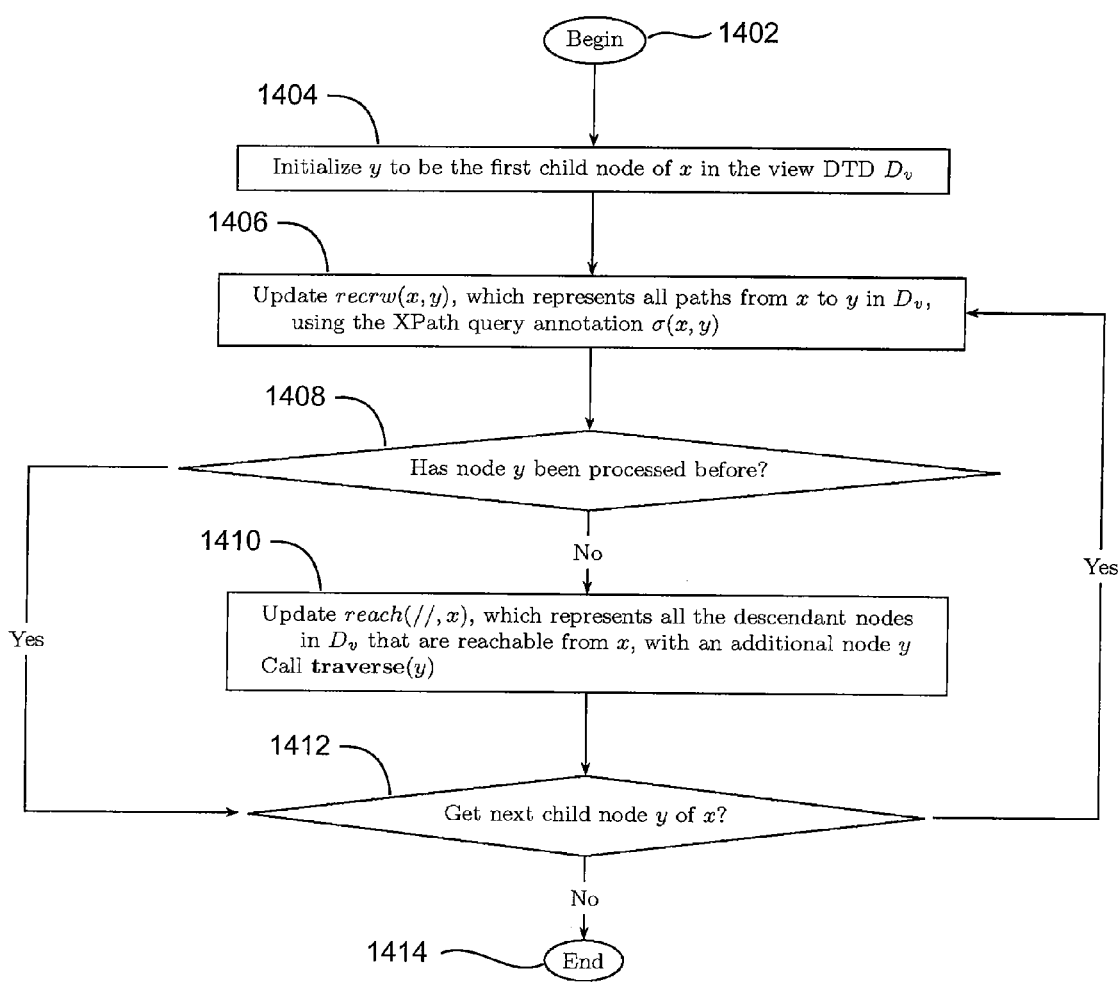
FIG. 14 depicts a flow chart for practicing a second sub process of the method and pseudo code of FIG. 6.

As discussed earlier with respect to step 1306 of algorithm recProc above, the second sub process to compute, reach and recrw in one embodiment of the invention is a series of method steps 1400 as shown in FIG. 14. Specifically, the series of method steps are identified as "Algorithm Traverse" which accepts as an input a node x in the DTD and outputs a value for reach (//,X) and (recrw X, Y) for each child node Y of X. Specifically, the method begins at step 1402 and proceeds to step 1404 where the value Y is initialized to be the first child node of X in the view DTD $D_v$. At step 1406, the value of (recrw X, Y) is updated using query annotation. In one embodiment of the invention, XPath query annotation is used such as the annotation σ (X, Y). This updated value of rcrw represents all paths from X to Y in the view DTD $D_v$. Once the updating has been completed, the method proceeds to step 1408 where a decision is performed as to whether the node Y has been processed before. If the node has been processed before, the method jumps to step 1412 where another decision is performed. Specifically, a decision is made as to whether to get the next child node Y of X. If the next child node Y of X is not to be obtained, the answer to the query is no and the method ends at step 1414. If the answer to the query is yes, the method loops back to step 1406 where the updating is performed again.

If the answer to the inquiry at step 1408 is no, that is that node Y has not previously been processed, then the method proceeds to step 1410 where the parameter reach (//,X) is updated and then the subject Algorithm Traverse is called again with respect to child node Y of the presently processed node X. The parameter reach (//,X) represents all the descendant nodes in the view DTD that are reachable from X with an additional node Y.

Query rewriting becomes more intriguing when the view DTD is recursive. For example, consider the view DTD 704 shown in FIG. 7 (b), which is derived from the specification S 706 of FIG. 7 (c) (where, as in FIG. 4, normal edges point to inaccessible nodes). Consider query //b 702 over the view 704. Although the view DTD 704 is merely a sub-graph of the document DTD d for S, this query cannot be evaluated directly over instances of d since it returns the inaccessible b child of a. Algorithm "Rewrite" no longer works here since a direct translation of '//' leads to infinitely many paths. Although the query is equivalent to the regular expression (a/c)*/b, such regular expressions are beyond the expressive power of the XPath standard; thus, it is not always possible to rewrite an XPath query over a recursive view to an equivalent XPath query over a document DTD.

A solution to this problem is by unfolding recursive nodes. Unfolding a recursive DTD node A is defined as creating distinct children for A following the A production. Referring to FIG. 7 (b), unfolding node "c" by one level means creating a distinct a child for node "c" instead of referring to the existing "a" node, as shown in diagram 708 of FIG. 7 (d). Remember that a security view V:S→$D_v$ is defined over a concrete XML document T. Since the height of T is known, one can determine by how many levels recursive nodes need to be unfolded, and such an unfolding yields a non-recursive (DAG) view DTD that the document is guaranteed to conform to. This allows use of Algorithm "rewrite" as before. Unfolding $D_v$ to a DAG is possible since, as long as $D_v$ is consistent (i.e., there exist documents conforming to it), each recursive A must have a non-recursive rule. For example, a→b is the non-recursive rule for a→a|b, and a→b,ε is the non-recursive rule for a→b,a*. Thus, for a fixed T, one can determine the unfolding levels and apply the non-recursive rules at certain stages. Note that when T is updated, the adjustment to the DTD unfolding is rather mild and does not introduce any serious overhead. Additionally, while access-control specifications, security views and their derivation are all conducted at the schema-level (i.e., on DTDs only), query rewriting over recursive security views needs the height information of the concrete XML tree over which the queries are evaluated.

As presented earlier, the rewriting algorithm transforms a query over a security view to an equivalent query over the original document. However, the rewritten query may not be efficient. Accordingly, query optimization in the presence of a DTD D is considered. In other words, given an XPath query p, find another query $p_o$ such that over any instance T of D, (1) p and $p_o$ are equivalent, i.e., $p(T)=p_o(T)$; and (2) $p_o$ is more efficient than p, i.e., $p_o(T)$ takes less time/space to compute than $p(T)$. This is not only important in our access control model where queries generated by Algorithm "Rewrite" are optimized using the document DTD, but is also useful for query evaluation beyond the security context.

Algorithm "Optimize", is shown in one embodiment in FIG. 8 as a series of pseudo code steps 800. Given a DTD D and a $C^-$ query p, Algorithm "Optimize(D,r,p)" rewrites p to an equivalent yet more efficient $p_o$, where r is the root of D. The algorithm uses the following variables:

(1) For each sub-query p' of p and each type A in the DTD D, opt (p',A) denotes optimized p' at A, i.e., a query equivalent to but more efficient than p' when being evaluated at an A element. The variable is initially '⊥' indicating that opt(p',A) is not yet defined, which ensures that each sub-query is processed at each DTD node at most once.

(2) reach (p',A) is the set of nodes in D reachable from A via p', with an initial value φ.

(3) image (p',A) is the image graph of p' at A.

The algorithm also invokes the following procedures:

(1) recProc(A,B) is a mild variation of the version given in FIG. 6. It precomputes reach (//,A) and moreover, for each B in reach (//,A), derives a query recrw (A,B) that captures all the paths from A to B. It differs from the one of FIG. 6 in that there is no need to substitute annotations for a node label.

(2) simulate(image $(p_1,A)$, image $(p_2,A)$) checks whether image $(p_1,A)$ is simulated by image $(p_2,A)$, as described earlier.

(3) evaluate([q],A) evaluates a qualifier q at A by exploiting the DTD constraints, as given earlier.

Figure 15:
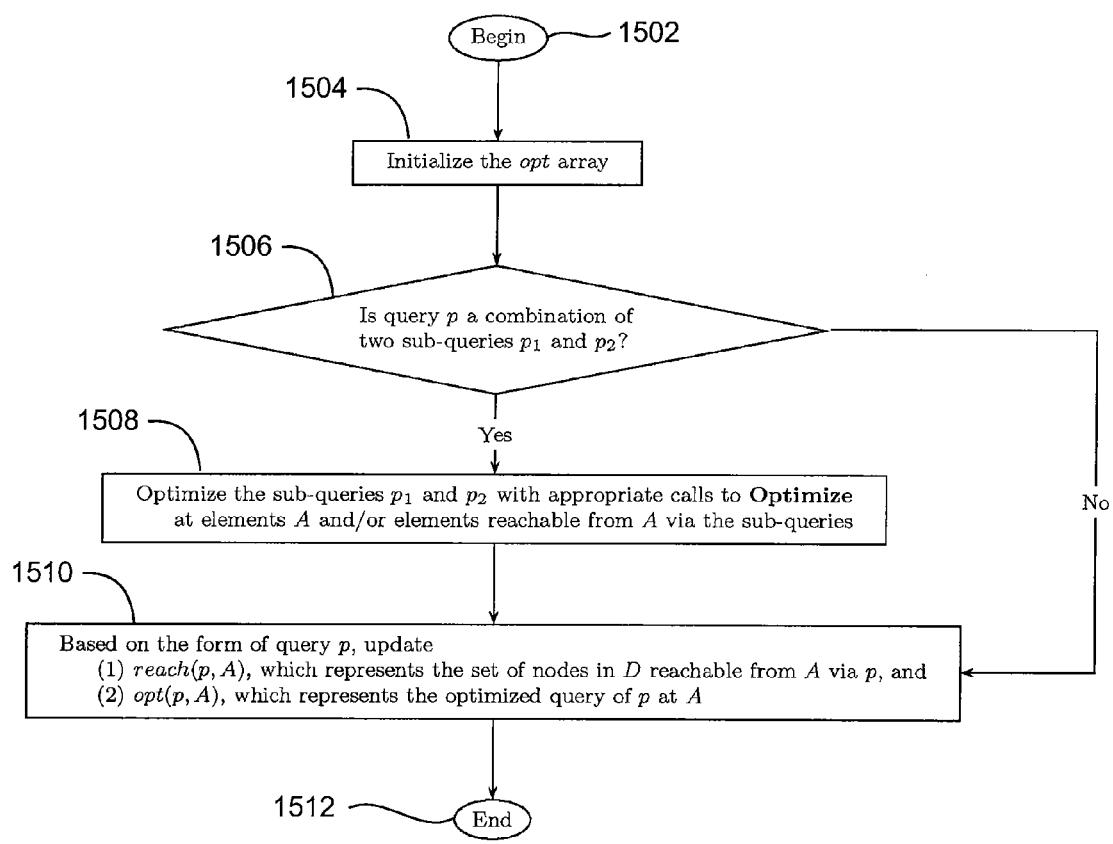
FIG. 15 depicts a flow chart for practicing the method and pseudo code of FIG. 8.

A general description of Algorithm Optimize is seen as a series of method steps 1500 in FIG. 15. In one embodiment of the method 1500, Algorithm Optimize takes a DTD, an element type A in D and a query p over D as inputs and outputs in optimized query over D that is equivalent to p at the A elements. Specifically, the method begins at step 1502 and proceeds to step 1504 wherein an array variable is initialized. In one embodiment, the array is opt as described earlier. Once the initialization process is complete, the method continues to step 1506 where a determination is made as to whether the input query p is a combination of two sub-queries $p_1$ and $p_2$. If the answer to the inquiry is yes, the method moves to step 1508 where optimization of the sub-queries $p_1$ and $p_2$ are performed by appropriate calls to the subject algorithm at elements A or elements reachable from A via the sub-queries. Once the optimization of sub-queries $p_1$, $p_2$ are performed, the method moves to step 1510 where updating of algorithm variables are performed. In one example, the variables reach (p,A) and opt (p,A) are updated based on the form of query p. The method ends at step 1510.

Figure 16:
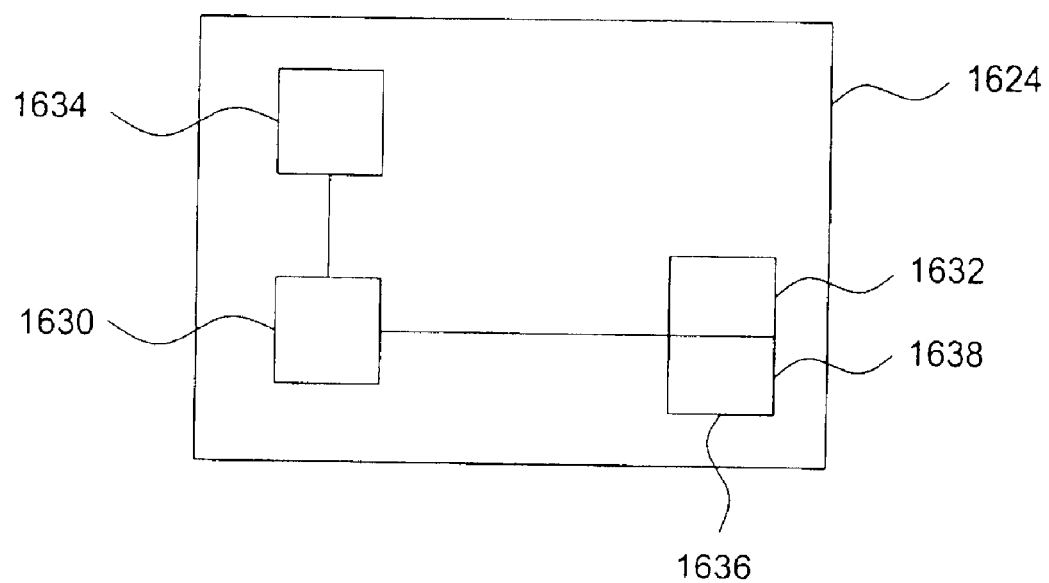
FIG. 16 depicts a apparatus for deriving security views of XML documents in accordance with the subject invention.

FIG. 16 details the internal circuitry of exemplary hardware that is used to execute the above-identified algorithms in the matter described to create the security views based on the security specifications and the original document DTD D. The hardware may be contained within the access control model 100 of FIG. 1 as a computer or other type of processing device or an external computing device having the necessary programming information (i.e., pseudo code of the above-identified figures) to remotely run the necessary algorithms. Specifically, the computing device comprises at least one central processing unit (CPU) 1630, support circuits 1634, and memory 1636. The CPU 1630 may comprise one or more conventionally available microprocessors. The support circuits 1634 are well known circuits that comprise power supplies, clocks, input/output interface circuitry and the like. Memory 1636 may comprise random access memory, read only memory, removable disk memory, flash memory, and various combinations of these types of memory. The memory 1636 is sometimes referred to as main memory and may in part be used as cache memory or buffer memory. The memory 1636 stores various software packages that dictate security view creation based on security view specification information and the document DTD; thus, in totality, forming a special purpose machine for doing same when running said software packages or a corresponding ASIC.

Experimental results clearly demonstrate both the efficiency of the subject query rewriting approach over a straight-forward query rewriting approach (that is based on element-level security annotations) as well as the benefits of the subject optimization techniques, particularly for large documents. Specifically, the subject query rewriting approach can achieve an improvement by up to a factor of 40 over naive query rewriting, which can be further improved by up to factor of 2 using the subject optimization algorithm. Experimental data sets were generated with the real-life Adex DTD, which is a standard proposed by the Newspaper Association of America for electronic exchange of classified advertisements. XML documents were generated using IBM's XML Generator tool by varying the maximum branching factor parameter to obtain four documents: D1(3.2 MB), D2(16.7 MB), D3(51.55 MB), and D4(77.0 MB). For the Adex DTD, a security view for a user was created where he is permitted to access only data related to real estate advertisements and data related to buyers. This security view is created by simply annotating the children of the root element adex as "N" and both the real-estate and buyer-info descendants as "Y" in the Adex DTD. The following four XPath queries on the Adex security view were considered:

Q1: //buyer-info/contact-info
Q2: //house/r-e.warranty|//apartment/r-e.warranty
Q3: //buyer-info[company-id and contact-info]
Q4: //house[//r-e.asking-price and //r-e.unit-type]

where Q1 simply retrieves the contact information of all buyers; Q2 retrieves the real estate warranty information for houses and apartments; Q3 retrieves information of buyers who have both company-id and contact-info sub elements and Q4 retrieves houses that have both asking price and unit type information.

Three different approaches (naive, rewrite, optimize) were compared in these experiments, all of which are based on the use of security views for querying. The first ("naïve") approach, which does not use DTD for query rewriting, requires the data documents to be annotated with additional element accessibility information and works as follows. A new attribute called "accessibility" is defined for each element in the XML document which is used to store the accessibility value of that element. The naive approach uses two simple rules to rewrite an input query to ensure that (a) it accesses only authorized elements and (b) it is converted to a query over the document. The first rule adds the qualifier [@accessibility="1"] to the last step of the query to ensure (a). The second rule replaces each child axis in the query with the descendant axis to ensure (b). The second rule is necessary since an edge in a security view DTD can represent some path in the document DTD. Thus, the naive approach represents a simple rewriting approach that relies on element-level annotations instead of DTD for query rewriting. The second ("rewrite") approach is the subject method of rewriting queries using DTD. The third ("optimize") approach is an enhancement of the second approach that further optimizes the rewritten queries using the subject optimizations. To compare the performance of the three approaches, a state-of-the-art XPath evaluation implementation was used that has been shown to be more efficient and scalable than several existing XPath evaluators. The experiments were conducted on a 2.4 GHz Intel Pentium IV machine with 512 MB of main memory running Microsoft Windows XP.

The experimental results are shown in Table 1, where each row compares the query evaluation time (in seconds) of naive, rewrite, and optimize approaches for a given document and query. For queries that can not be further improved by the optimize approach, we indicate this with a "–" value under the optimize column.

The naive approach evaluates Q1 as //buyer-info//contact-info[@ accessibility="1"], while the rewrite approach utilizes the DTD to expand Q1 into a more precise query /adex/head/buyerinfo/contact-info.

The naive approach rewrites Q2 to //house//r-e.warranty [@accessibility="1"]| //apartment//r-e.warranty [@accessibility="1"] while the rewrite approach expands the query to /adex/body/adinstance/real-estate/house/r-e.warranty. Note that the rewrite approach has simplified the second sub-expression to empty since the r-e.warranty element is not a sub-element of apartment.

The naive approach evaluates Q3 as //buyerinfo[//company-id and //contact-info][@accessibility="1"], while the rewrite approach expands the query to /adex/head/buyerinfo [company-id and contact-info]. The optimize approach further exploits the co-existence constraint that each buyer-info element has both company-id and contact-info sub-elements to simplify the rewritten query to /adex/head/buyer-info.

Query Q4 shows the benefit of exploiting the exclusive constraint. The rewrite approach expands the query to /adex/body/adinstance/real-estate [house/r-e.asking-price and apartment/r-e.unittype], which is further refined by the optimize approach to an empty query since the real-estate element can not have both house and apartment sub-elements; thus the evaluation of Q4 can be avoided.

TABLE 1

| Query | Data Set | Naïve | Rewrite | Optimize |
|---|---|---|---|---|
| Q1 | D1 | 4.12 | 0.44 | — |
|  | D2 | 39.75 | 2.69 | — |
|  | D3 | 416.85 | 12.09 | — |
|  | D4 | 917.64 | 22.53 | — |
| Q2 | D1 | 8.49 | 0.54 | — |
|  | D2 | 72.41 | 2.81 | — |
|  | D3 | 916.15 | 11.42 | — |
|  | D4 | 1406.56 | 19.16 | — |
| Q3 | D1 | 4.1 | 0.54 | 0.50 |
|  | D2 | 41.20 | 2.92 | 2.67 |
|  | D3 | 464.66 | 11.39 | 8.15 |
|  | D4 | 1128.12 | 36.07 | 15.89 |
| Q4 | D1 | 3.89 | 0.51 | 0 |
|  | D2 | 40.58 | 3.17 | 0 |

TABLE 1-continued

| Query | Data Set | Naïve | Rewrite | Optimize |
|---|---|---|---|---|
|  | D3 | 466.61 | 11.31 | 0 |
|  | D4 | 1021.51 | 38.03 | 0 |

Overall, the experimental results demonstrate the effectiveness of the proposed query rewriting technique for processing secured XML queries. The results also emphasize the importance of using DTD constraints to optimize the evaluation of XPath queries on large XML documents. Given these, Algorithm Optimize (D,A,p) rewrites query p at A elements based on the structures of p and A. It recursively prunes redundant sub-queries of p by exploiting the structural constraints of the DTD D.

Several embodiments of the present invention are specifically illustrated and/or described herein. However, it will be appreciated that modifications and variations of the present invention are covered by the above teachings and within the purview of the following claims without departing from the spirit and intended scope of the invention.

We claim:

1. A method for securely providing access to Extensible Markup Language (XML) data of an XML document comprising:

Defining at least one access control policy for at least one user of the XML document; and Deriving a security view of a Document Type Definition (DTD) of the XML document for the schema level processing employs at least one internal query annotation, made to the DTD, describing the access control policy, wherein the security view is computed as a function of a DTD view and a function defined via Xpath queries, wherein the step of deriving a security view further comprises invoking, if a first accessible element type of the DTD has not been previously processed, a first sub process that includes:

Computing a query annotation for each child element in a production rule of the first accessible element type;

Computing a view production rule for the first accessible element type in a view DTD representing an accessible portion of the XML document; and Computing a security view for each child element in the production rule of the first accessible element type.

2. The method of claim 1 further comprising:

(c) translating a user query based on the security view of the XML document to an equivalent query based on the XML document.

3. The method of claim 1 wherein the step of computing a security view for each child element in the production rule of the first accessible element type further comprises invoking a second sub process if a child element in the production rule of the first accessible element type is inaccessible; otherwise, the first sub process is invoked for the child element.

4. The method of claim 3 wherein then the second sub process performs the steps of: computing a path for each child element in a production rule of a first inaccessible element type; computing an expression for the first inaccessible element type; and computing a security view for each child element in the production rule of the first inaccessible element type.

5. The method of claim 4 wherein the step of computing a security view for each child element in the production rule of the first inaccessible element type further comprises invoking the second sub process if a child element in the production rule of the first inaccessible element type is inaccessible; otherwise, the first sub process is invoked for the child element.

6. The method of claim 2 wherein the step of translating the user query based on the security view of the XML document further comprises:

iteratively computing at least one local translation corresponding to at least one subquery of the first accessible element type that is part of the user query.

7. The method of claim 6 wherein iteratively computing at least one local translation further comprises:

computing at least one local translation corresponding to at least one subquery of a child element of the first accessible element type; and combining all of said at least one local translation(s) corresponding to at least one subquery of a child element.

8. Apparatus for performing an operation of securely providing access to Extensible Markup Language (XML) data of an XML document comprising:

means for defining at least one access control policy for at least one user of the XML document; and means for deriving a security view of a Document Type Definition (DTD) of the XML document for the schema level processing employs at least one internal query annotation, made to the DTD, describing the access control policy, wherein the security view is computed as a function of a DTD view and a function defined via Xpath queries, wherein the step of deriving a security view further comprises invoking, if a first accessible element type of the DTD has not been previously processed, a first sub process that includes:

Computing a query annotation for each child element in a production rule of the first accessible element type;

Computing a view production rule for the first accessible element type in a view DTD representing an accessible portion of the XML document; and Computing a security view for each child element in the production rule of the first accessible element type.

9. The apparatus of claim 8 further comprising: means for translating a user query based on the security view of the DTD of the XML document to an equivalent query based on the DTD of the XML document.

10. The apparatus of claim 8 wherein the means for defining the at least one access control policy further comprises an access specification.

11. The apparatus of claim 10 wherein the access specification annotates the DTD representing the XML document.

12. The apparatus of claim 8 wherein the means for deriving a security view of the XML document is further adapted to invoke, if a child element in the production rule of the first accessible element type is inaccessible, a second sub process that includes:

Computing a path for each child element in a production rule of a first inaccessible element type;

Computing an expression for the first inaccessible element type; and

Computing a security view for each child element in the production rule of the first inaccessible element type.

13. The apparatus of claim 9 wherein the means for translating a user query based on the security view of the XML document to an equivalent query based on the XML document further comprises a query evaluator that maps one or more nodes in the security view to corresponding one or more nodes in the Document Type Definition (DTD) representing the XML document.

\* \* \* \* \*